United States Patent
Smyth et al.

[11] Patent Number: 5,722,463
[45] Date of Patent: Mar. 3, 1998

[54] EXTERNAL PIPE REINFORCING SLEEVE

[75] Inventors: Robert James Smyth; Paul Lelonde, both of Calgary; Alcide St. Jean, Leduc; Michael Alvin Miller, Leduc; Darcy Evan Miller, Leduc, all of Canada

[73] Assignee: Petro-Line Upgrading Services Ltd., Nisku, Canada

[21] Appl. No.: 758,155

[22] Filed: Nov. 25, 1996

[51] Int. Cl.⁶ ..................................... F16L 9/00
[52] U.S. Cl. .................. 138/170; 138/171; 138/158; 138/77
[58] Field of Search .................. 138/170, 77, 156, 138/158, 162, 167, 166, 171, 172

[56] References Cited

U.S. PATENT DOCUMENTS

| | | | |
|---|---|---|---|
| 3,455,336 | 7/1969 | Ellis | 138/156 |
| 4,135,553 | 1/1979 | Evans et al. | 138/141 |
| 4,219,051 | 8/1980 | D'Haeyer | 138/178 |
| 4,260,181 | 4/1981 | Curtin | 138/162 X |
| 4,268,559 | 5/1981 | Smuckler | 138/166 X |
| 4,366,011 | 12/1982 | Nolf | 156/86 |
| 4,448,824 | 5/1984 | Holmes et al. | 428/33 |
| 4,517,234 | 5/1985 | Fisher | 428/119 |
| 4,533,419 | 8/1985 | Pieslak et al. | 156/85 |
| 4,673,122 | 6/1987 | Dubey | 138/99 X |
| 4,709,729 | 12/1987 | Harrison | 138/99 |
| 4,790,058 | 12/1988 | Miller | 29/407 |
| 4,860,799 | 8/1989 | Van Noten | 138/99 X |
| 5,007,666 | 4/1991 | Kyfes | 138/162 X |

*Primary Examiner*—Patrick Brinson
*Attorney, Agent, or Firm*—Thomas E. Malyszko

[57] ABSTRACT

In an external steel sleeve for reinforcing or for providing a seal to prevent leakage in a pipe, the sleeve consists of steel plate material that is shaped and sized to encircle a portion of the length of the pipe. The top and bottom halves of the sleeve each consist of steel shaped plate, and the bottom half in addition has zippers welded on either side. The sleeve may be installed while the carrier pipe is under operating pressure and temperature. Following cleaning of the pipe and sleeve surfaces, if necessary, including cleaning of any external anomalies on the section of pipe to be reinforced, an epoxy filler material is applied to the pipe over the area to be covered by the sleeve. The top and bottom halves of the sleeve are then placed around the pipe and initially tightened using hydraulic jacking devices. The sleeve halves are then heated uniformly to a predetermined temperature and are maintained at that temperature while welding the zippers, which are located 180 degrees to each other, to the top half of the sleeve. Upon allowing the sleeve to cool, the sleeve shrinks, thus applying compressive forces onto the pipe. The epoxy acts both as a filler agent and sealant, filling all voids between the pipe and the sleeve. The pipe and sleeve therefore act as one unit, expanding and contracting with fluctuations in the pipe's pressure and temperature. The sleeve prevents the anomaly from rupturing and prevents product leakage should corrosion eat through the pipe wall from within.

17 Claims, 1 Drawing Sheet

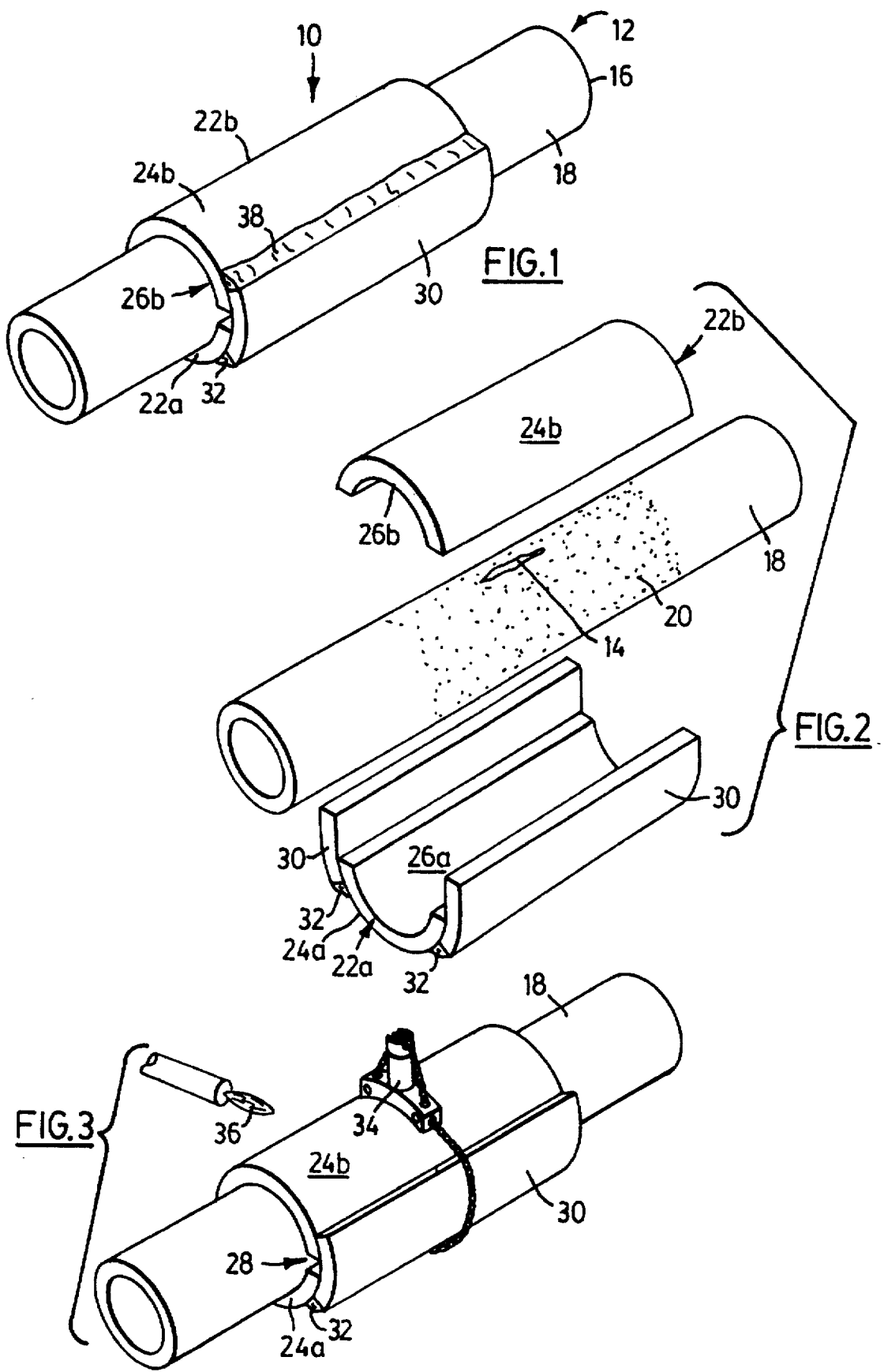

5,722,463

1

EXTERNAL PIPE REINFORCING SLEEVE

FIELD OF THE INVENTION

The present invention relates to a reinforcing assembly for a pipe, and in particular to an external sleeve for reinforcing or sealing pipes used in the oil and gas industry.

BACKGROUND OF THE INVENTION

It is well known that pipes in general, and particularly pipes used in the oil and gas industry, are subject to defects such as corrosion, mill defects, stress corrosion cracking, and hydrogen induced cracking. During installation and operation of a pipe, pipe wall defects having the potential to cause failure are identified. The usual methods of preventing such defects from causing a failure are either to remove the defect by cutting out an entire cylindrical section of the pipe, or by significantly reducing the internal pressure in the pipe prior to either welding a pressure containing sleeve onto the pipe or by applying a mechanically tightened or fibre glass sleeve to the pipe.

A disadvantage of these prior methods is that they may require pipe system shut downs and a resultant loss of throughput of product in the pipe. For instance, shut downs are typically required where sleeves are welded directly to a pipe. Such methods also involve occupational hazards, potential metallurgical failures, and costly expenditures. Another disadvantage is that prior art sleeves, if installed while the pipe is under operating pressures, can loosen and separate from the pipe if the operating pressure later drops for any reason. As a result, prior art sleeves require frequent maintenance, repair and replacement, which adds significantly to the operating costs of a pipe.

What is desired therefore is a pipe reinforcing sleeve which overcomes the limitations and disadvantages of these other prior art sleeves. Preferably the sleeve should not be welded to the pipe, and should be capable of being installed whether the pipe is pressurized (i.e. operating) or not. If installed while the pipe is pressurized, the sleeve should remain firmly secured to the pipe upon depressufization or shut down. Further, the sleeve should be capable of relatively quick and efficient installation to reduce installation costs.

SUMMARY OF THE INVENTION

In one aspect the present invention provides a method of reinforcing a longitudinal section of hollow pipe comprising:

providing at least two sleeve segments, each sleeve segment having an inside surface adapted to fit onto an outer surface of said pipe;

preparing at least one of said outer surface of the pipe and said inside surface of the sleeve segments for receiving an epoxy;

applying said epoxy to at least one of said outer surface of the pipe and said inside surface of the sleeve segments;

mounting said sleeve segments onto said pipe with said epoxy located therebetween;

applying a clamping force to squeeze said sleeve segments onto said epoxy and said outer surface of the pipe;

heating said sleeve segments to a predetermined temperature above the temperature of said pipe sufficient for thermal expansion of said sleeve segments;

joining said sleeve segments while expanded to form a continuous sleeve circumferentially about said pipe; and

2 removing said clamping force, and allowing said sleeve to cool to said temperature of the pipe to form an interference fit therebetween and to seal said section of pipe to avoid leakage of product therefrom.

In another aspect the invention a sleeve assembly for reinforcing a longitudinal section of hollow comprising:

an epoxy material; and first and second sleeve segments adapted to fit onto an outer surface of said pipe so as to substantially circumferentially encompass said pipe;

said sleeve assembly being formed by:

preparing at least one of said outside surface of the pipe and said sleeve segments for contact with said epoxy material;

coating said outside surface of the pipe with said epoxy material and placing said sleeve segments over said epoxy material;

applying a radial clamping force to squeeze said sleeve segments onto said outer surface of the pipe;

heating said sleeve segments to thermally expand said sleeve segments;

joining said sleeve segments together about said pipe while said sleeve segments are thermally expanded; and forming an interference fit between said sleeve assembly and said pipe upon removal of said clamping force by cooling said sleeve segments.

DESCRIPTION OF THE DRAWINGS

Embodiments of the invention will now be described, by way of example only, with reference to the accompanying drawings, wherein:

FIG. 1 is a perspective view of an external pipe reinforcing sleeve installed onto a longitudinal section of hollow pipe according to a preferred embodiment of the present invention;

FIG. 2 shows the sleeve of FIG. 1 prior to installation over a defect in the pipe; and FIG. 3 shows the sleeve of FIG. 1 during installation with a hydraulic jack applying a clamping force and heating of the sleeve.

DESCRIPTION OF PREFERRED EMBODIMENTS

The figures show a sleeve according to a preferred embodiment of the invention (generally indicated by reference numeral 10) and a process of mounting the sleeve onto a hollow pipe 12. The sleeve 10 is mounted over a longitudinal section or portion of pipe 12 which requires reinforcement, for instance to prevent rupture or leakage of an defect or anomaly 14 in the pipe wall 16. The defect may be a stress crack, an area of pipe wall degradation due to corrosion, a dent, and the like. For illustrative purposes, the pipe 12 is one which transports hydrocarbons under pressure, such as a natural gas or oil pipeline. Whether the pipeline is located above or below ground, it is typically subject to internal pressure fluctuations, internal and external temperature fluctuations, and to both internal and external corrosive agents. It will be appreciated by those skilled in the art, however, that the sleeve 10 is not restricted to use on such pipelines but is also suitable for use on various types of pipes as well, such as those used for transporting drinking water, sewage, and a host of other liquids and gases, whether pressurized or not.

Referring now to FIG. 2, the generally cylindrical outer surface 18 of the pipe 12 in the vicinity of the defect 14

(shaded area indicated by 20) should be prepared for receiving a binding agent, referred to herein as an epoxy, as well as first and second sleeve segments 22a and 22b, respectively. Since the pipe 12 is typically constructed of plate steel and has been exposed to the elements for some time, the outer surface 18 should be cleaned of rust and any foreign substances (e.g. oil) to allow the epoxy to bind thereto and to provide good contact with the sleeve segments 22a, 22b. Sand-blasting has provided good results.

The sleeve segments 22a, 22b are shaped and sized to encircle the section of pipe to be reinforced. Each sleeve segment 22a, 22b is formed of plate steel with an outside surface 24a and 24b, respectively, and an inside surface 26a and 26b, respectively, having a radius of curvature generally matching that of the pipe's outer surface 18 so as to fit thereon. The sleeve segments together substantially circumferentially encompass the pipe, leaving a small gap 28, say about 0.25 to 0.50 inches, between facing ends of the sleeve segments on opposed sides of the pipe to accommodate thermal expansion of the sleeve segments as described later. In order to fit onto the pipe, each sleeve segment must not exceed a semi-circular shape in transverse cross-section with an arc of no more than 180 degrees. It will be appreciated that in peculiar circumstances three or more sleeve segments may be provided wherein the segments side-by-side substantially encompass the pipe, but this is not preferred because of the added cost and complexity of welding the segments together, as described later. It will also be appreciated that the outside surfaces 24a, 24b form smooth curved surfaces as shown, although this need not be the case. The sleeve segments may also be formed of material other than plate steel, such a stainless steel which is also easy to weld. It is preferable, however, that the sleeve segments be formed of material which matches or is complementary to that of the carrier pipe 12 to avoid promoting corrosion by setting up a cathodic cell or reaction therebetween. Prior to installation, the inside surfaces 26a, 26b should be cleaned of rust and any foreign substances to allow the epoxy to bind thereto. The preparation may be done on site or in the shop.

A connector plate, or zipper, 30 is welded to the opposed ends of one of the sleeve segments (in the present case to the first sleeve segment 22a) as indicated at 32. Typically such welding is performed prior to installing the sleeve segments onto the pipe, although such welding could be delayed until the sleeve segments and zippers are clamped onto the pipe as discussed below. The latter option is not preferred because of greater handling difficulties. Each zipper 30 must extend beyond the opposed circumferential ends of the sleeve segment 24a so as to overlap with the outside surface of the second sleeve segment 22b as shown in FIGS. 1 & 3. Each zipper may be composed of several plates, if desired. The zipper should be of a complementary or matching material to that of the sleeve segments to minimize or avoid cathodic reaction therebetween. One zipper 30 could also be joined to each sleeve segment, if symmetrical sleeve segments are desired. The zippers may also be formed integrally with the sleeve segment, but production costs may be higher with this option. Although alternate joining means may be used, such as hinges or bolts, this is not preferred because of possible interference with the sleeve's fit onto the pipe, greater difficulties in coating the sleeve once installed, possible corrosion at bolt interfaces, and industry perceptions that such connections are temporary.

The method of forming a sleeve on the pipe 12 according to the present invention will now be described. Having prepared the pipe's outer surface 18 and the inside surfaces 26a, 26b of the sleeve segments as described above, the epoxy is applied around the pipe to the outer surface 18 in the vicinity 20 of the defect. Alternately the epoxy might be applied to the inside surfaces of the sleeve segments, but generally this is not as practical. The sleeve segment 22b and sleeve segment 22a, which has the zippers 30 welded thereto, are then placed onto the outer surface 18 over the epoxy and tightly clamped to the pipe as shown in FIG. 3. Good results have been achieved using a hydraulic jack and chain assembly 34 to provide the necessary radial clamping force for squeezing the sleeve segments onto the epoxy and the pipe's outer surface. More jack assemblies 34 may be used depending on the desired clamping force and the length of the sleeve segments, for example. More clamping force may be required where the pipe is depressurised during installation, for example, because certain pipes which are generally round when pressurized sometimes become slightly oval in shape upon depressurization. It is noted that prior to installation the inside surfaces 26a, 26b of the sleeve segments should also be inspected and cleaned, if necessary, as described earlier for the outer surface 18 of the pipe.

Heat is next applied to the clamped sleeve segments using torches, as at 36, or other suitable means, to thermally expand the sleeve segments 22a, 22b. While in their expanded state, both zippers 30 are welded to the second sleeve segment 22b (as indicated on one side at 38), thereby joining both sleeve segments together to form a continuous sleeve 10 circumferentially about the pipe 12 as shown in FIG. 1. The hydraulic jack 34 and clamping force is then removed and the sleeve is allowed to cool to the same temperature as the pipe 12. As the sleeve cools, the plate steel contracts to form an interference fit with the pipe, thereby reinforcing and sealing that section of pipe with the aid of the epoxy. Immediately following installation and cooling of the sleeve, corrosion inhibiting material may be wrapped or otherwise applied to the sleeve and surrounding area followed by backfilling over the sleeve. The type of material used will depend on clients' requests, and may range from a tar-type material to a spray on inhibitor.

The temperature to which the sleeve is heated depends on the temperature of the pipe at the time of installation and the amount by which the pipe is expanded from its "normal" state with no internal pressure. Such expansion will depend on factors such as the pipe's wall thickness and its internal pressure at the time. In any event, the temperature to which the sleeve segments are heated should provide sufficient thermal expansion so that upon forming the sleeve and subsequent cooling, the sleeve will remain in tension whether the pipe is internally pressurized or depressurized (i.e. at ambient or normal atmospheric pressure). As a result, the portion of pipe beneath the sleeve should remain substantially in compression with respect to the tension in the sleeve whether the pipe is pressurized or not. Good results have been achieved with plate steel sleeves being heated to between 100 and 300 degrees F. above the temperature of the pipe.

It is preferable that the sleeve be installed while the pipe's surface temperature is within the temperature curing range of the epoxy. If not, some heat may continue to be applied to the sleeve after joining of the sleeve segments to properly cure the epoxy. Such situations arise more frequently in cold climates or winter conditions. For example, certain epoxies might require that the sleeve be kept at about 60 degrees F. for 24 hours. Fortunately, some epoxies are now capable of curing below 32 degrees F., which reduces heating costs and installation delays.

Several advantages and benefits of the present invention may now be better appreciated. First, it eliminates the requirement of many prior art sleeves to weld the sleeve to the pipe, thus avoiding the possibility of creating cracking in the welds on the pipe. Second, the sleeve 10 can be installed whether the pipe is pressurized or not, thus avoiding shut down of the pipe and disruption of flow of product for repair work, resulting in significant cost savings to the pipe operator. Similarly, the present invention eliminates the need to cut away and remove an entire cylindrical section of defective pipe, consequently avoiding disruption of flow of product, and occupational and environmental hazards related to product contained in the pipe. Third, the epoxy and plate steel complement one another, namely the epoxy acts as a sealing agent to prevent product leakage from the pipe, while the plate steel prevents cracks in the pipe wall from extending and thin locations in the pipe wall from rupturing. Fourth, significant reductions in operating stress levels in the pipe have been achieved in test installations of the sleeve. Fifth, the pipe and the sleeve have been found to act as one unit during pressurizing and depressurizing of the pipe, namely without any dislocation of the sleeve from the pipe.

The above description is intended in an illustrative rather than a restrictive sense and variations to the specific configurations described may be apparent to skilled persons in adapting the present invention to specific applications. Such variations are intended to form part of the present invention insofar as they are within the spirit and scope of the claims below. For example, the sleeve segments 22a, 22b might be welded together by omitting the zippers 30. This is not desireable, however, due to resultant difficulties in estimating the exact size of gap 28 required so that both sleeve segments are thermally expanded on the pipe into an abutting relationship. It will also be appreciated that if the gap is too small, the sleeve segments will force each other away from the pipe's outer surface 18; and, if the gap is not closed upon expansion between the sleeve segments, then a welding facilitator, such as a thin metal plate, will likely have to be placed in the remaining gap in any event to allow welding between the segments.

We claim:

1. A method of reinforcing a longitudinal section of hollow pipe comprising:

providing at least two sleeve segments, each sleeve segment having an inside surface adapted to fit onto an outer surface of said pipe, wherein said sleeve segments comprise two rolled steel plates;

preparing at least one of said outer surface of the pipe and said inside surface of the sleeve segments for receiving an epoxy;

applying said epoxy to at least one of said outer surface of the pipe and said inside surface of the sleeve segments;

mounting said sleeve segments onto said pipe with said epoxy located therebetween;

applying a clamping force to squeeze said sleeve segments onto said epoxy and said outer surface of the pipe;

heating said sleeve segments to a temperature between 100 degrees F. and 300 degrees F. above the temperature of the pipe and sufficient for thermal expansion of said sleeve segments;

joining said sleeve segments while expanded to form a continuous sleeve circumferentially about said pipe; and, removing said clamping force, and allowing said sleeve to cool to said temperature of the pipe to form an interference fit therebetween and to seal said section of pipe to avoid leakage of product therefrom, wherein said temperature to which said sleeve segments are heated provides sufficient thermal expansion so that upon said joining and subsequent cooling said sleeve remains in tension whether said pipe is internally pressurized or depressurized.

2. A method of reinforcing a longitudinal section of hollow pipe comprising:

providing at least two sleeve segments, each sleeve segment having an inside surface adapted to fit onto an outer surface of said pipe;

preparing at least one of said outer surface of the pipe and said inside surface of the sleeve segments for receiving an epoxy;

applying said epoxy to at least one of said outer surface of the pipe and said inside surface of the sleeve segments;

mounting said sleeve segments onto said pipe with said epoxy located therebetween;

applying a clamping force to squeeze said sleeve segments onto said epoxy and said outer surface of the pipe;

heating said sleeve segments to a predetermined temperature above the temperature of said pipe sufficient for thermal expansion of said sleeve segments;

welding said sleeve segments together while expanded to form a continuous sleeve circumferentially about said pipe; and, removing said clamping force, and allowing said sleeve to cool to said temperature of the pipe to form an interference fit therebetween and to seal said section of pipe to avoid leakage of product therefrom, wherein said temperature to which said sleeve segments are heated provides sufficient thermal expansion so that upon said welding and subsequent cooling said sleeve remains in tension whether said pipe is internally pressurized or depressurized.

3. A method of reinforcing a longitudinal section of hollow pipe comprising:

providing at least two sleeve segments, each sleeve segment having radially opposed ends and an inside surface adapted to fit onto an outer surface of said pipe;

preparing at least one of said outer surface of the pipe and said inside surface of the sleeve segments for receiving an epoxy;

applying said epoxy to at least one of said outer surface of the pipe and said inside surface of the sleeve segments;

mounting said sleeve segments onto said pipe with said epoxy located therebetween;

applying a clamping force to squeeze said sleeve segments onto said epoxy and said outer surface of the pipe;

heating said sleeve segments to a predetermined temperature above the temperature of said pipe sufficient for thermal expansion of said sleeve segments; joining said sleeve segments while expanded to form a continuous sleeve circumferentially about said pipe, wherein said joining comprises fixing at least one connector to each pair of facing opposed ends of said sleeve segments to form said sleeve; and, removing said clamping force, and allowing said sleeve to cool to said temperature of the pipe to form an interference fit therebetween and to seal said section of pipe to avoid leakage of product therefrom, wherein said temperature to which said sleeve segments are heated provides sufficient thermal expansion so that upon said joining and subsequent cooling said sleeve remaining tension whether said pipe is internally pressurized or depressurized.

4. The method of claim 3 wherein said connectors are fixed to the opposed ends of at least one of said sleeve segments prior to said placing of said sleeve segments onto said epoxy.

5. The method of claim 3 wherein each pair of said facing ends is spaced apart to provide a gap for said thermal expansion of said sleeve segments.

6. The method of claim 5 wherein said fixing comprises welding said connectors to said sleeve segments.

7. A method of reinforcing a longitudinal section of hollow pipe comprising:

providing at least two sleeve segments, each sleeve segment having an inside surface adapted to fit onto an outer surface of said pipe;

preparing at least one of said outer surface of the pipe and said inside surface of the sleeve segments for receiving an epoxy;

applying said epoxy to at least one of said outer surface of the pipe and said inside surface of the sleeve segments;

mounting said sleeve segments onto said pipe with said epoxy located therebetween;

applying a clamping force to squeeze said sleeve segments onto said epoxy and said outer surface of the pipe;

heating said sleeve segments to a predetermined temperature above the temperature of said pipe sufficient for thermal expansion of said sleeve segments;

joining said sleeve segments while expanded to form a continuous sleeve circumferentially about said pipe;

removing said clamping force, and allowing said sleeve to cool to said temperature of the pipe to form an interference fit therebetween and to seal said section of pipe to avoid leakage of product therefrom, wherein said temperature to which said sleeve segments are heated provides sufficient thermal expansion so that upon said joining and subsequent cooling said sleeve remains in tension whether said pipe is internally pressurized or depressurized; and, applying heat to said sleeve after removing said clamping force for a time sufficient to cure said epoxy if the temperature of said outer surface of said pipe is outside the temperature curing range of said epoxy.

8. A method of reinforcing a longitudinal section of hollow pipe comprising:

providing at least two sleeve segments, each sleeve segment having an inside surface adapted to fit onto an outer surface of said pipe;

preparing at least one of said outer surface of the pipe and said inside surface of the sleeve segments for receiving an epoxy;

applying said epoxy to at least one of said outer surface of the pipe and said inside surface of the sleeve segments;

mounting said sleeve segments onto said pipe with said epoxy located therebetween;

applying a clamping force to squeeze said sleeve segments onto said epoxy and said outer surface of the pipe;

heating said sleeve segments to a predetermined temperature above the temperature of said pipe sufficient for thermal expansion of said sleeve segments;

joining said sleeve segments while expanded to form a continuous sleeve circumferentially about said pipe;

removing said clamping force, and allowing said sleeve to cool to said temperature of the pipe to form an interference fit therebetween and to seal said section of pipe to avoid leakage of product therefrom; and, coating said sleeve with a corrosion inhibiting material following said cooling of said sleeve.

9. A method of reinforcing a longitudinal section of hollow pipe comprising:

providing at least two sleeve segments, each sleeve segment having an inside surface adapted to fit onto an outer surface of said pipe;

preparing at least one of said outer surface of the pipe and said inside surface of the sleeve segments for receiving an epoxy;

applying said epoxy to at least one of said outer surface of the pipe and said inside surface of the sleeve segments;

mounting said sleeve segments onto said pipe with said epoxy located therebetween;

applying a clamping force to squeeze said sleeve segments onto said epoxy and said outer surface of the pipe using at least one hydraulic jacking device;

heating said sleeve segments to a predetermined temperature above the temperature of said pipe sufficient for thermal expansion of said sleeve segments;

joining said sleeve segments while expanded to form a continuous sleeve circumferentially about said pipe; and, removing said clamping force, and allowing said sleeve to cool to said temperature of the pipe to form an interference fit therebetween and to seal said section of pipe to avoid leakage of product therefrom.

10. The method of claim 9 wherein said sleeve segments are formed of a material having a coefficient of expansion similar to that of said pipe.

11. The method of claim 10 wherein said sleeve segments are formed of substantially similar material as that of said pipe to minimize cathodic reaction therebetween.

12. The method of claim 11 wherein said material of said sleeve segments comprises plate steel.

13. A sleeve assembly for reinforcing a longitudinal section of hollow comprising:

an epoxy material; and first and second sleeve segments, each sleeve segment having radially opposed ends, said sleeve segments adapted to fit onto in outer surface of said pipe so as to substantially circumferentially encompass said pipe;

said sleeve assembly being formed by:

preparing at least one of said outside surface of the pipe and said sleeve segments for contact with said epoxy material;

coating said outside surface of the pipe with said epoxy material and placing said sleeve segments over said epoxy material;

applying a radial clamping force to squeeze said sleeve segments onto said outer surface of the pipe;

heating said sleeve segments to thermally expand said sleeve segments;

joining said sleeve segments together about said pipe while said sleeve segments are thermally expanded, wherein at least one connector plate is welded to each pair of facing opposed ends of said sleeve segments to join said sleeve segments upon said heating; and forming an interference fit between said sleeve assembly and said pipe upon removal of said clamping force by cooling said sleeve segments.

14. The sleeve assembly of claim 13 wherein said connector plates are welded to the opposed ends of said first sleeve segment prior to said placing of the sleeve segments over said epoxy so that upon heating of said sleeve segments said connector plates need only be welded to respective ends of said second sleeve segment.

15. The sleeve assembly of claim 14 wherein said sleeve segments are formed of material substantially similar to that of said pipe to minimize cathodic reaction therebetween.

16. The sleeve assembly of claim 15 further comprising a corrosion inhibiting material placed over said joined sleeve segments following said cooling.

17. The sleeve assembly of claim 16 wherein at least one hydraulic jacking device provides said radial clamping force.

* * * * *